United States Patent
Doidge et al.

(10) Patent No.: US 6,944,164 B2
(45) Date of Patent: Sep. 13, 2005

(54) METHOD AND APPARATUS FOR HARDWARE FORWARDING OF LAN FRAMES OVER ATM NETWORKS

(75) Inventors: Dennis Albert Doidge, Apex, NC (US); Jim P. Ervin, Raleigh, NC (US); Douglas Ray Henderson, Raleigh, NC (US); Edward Hau-chun Ku, Cary, NC (US); Pramod Narottambhai Patel, Cary, NC (US); Loren Blair Reiss, Raleigh, NC (US); Thomas Eric Ryle, Raleigh, NC (US); Joseph M. Rash, Wake Forest, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/698,248

(22) Filed: Oct. 31, 2003

(65) Prior Publication Data

US 2004/0090987 A1 May 13, 2004

Related U.S. Application Data

(62) Division of application No. 09/515,746, filed on Feb. 29, 2000.

(51) Int. Cl.$^7$ .............................. H04L 12/28; H04J 3/34
(52) U.S. Cl. .................... 370/395.53; 370/474
(58) Field of Search .............................. 370/412, 401, 370/474, 466, 470, 471, 389, 395.53, 395.3, 395.1; 709/227

(56) References Cited

U.S. PATENT DOCUMENTS

| | | | | |
|---|---|---|---|---|
| 5,715,250 A | * | 2/1998 | Watanabe | 370/395 |
| 5,732,071 A | * | 3/1998 | Saito et al. | 370/255 |
| 5,910,954 A | * | 6/1999 | Bronstein et al. | 370/401 |
| 5,974,452 A | * | 10/1999 | Karapetkov et al. | 709/218 |

* cited by examiner

Primary Examiner—Duc Ho
(74) Attorney, Agent, or Firm—Jeanine S. Ray-Yarletts

(57) ABSTRACT

A multiported LAN switch comprised of legacy local area network ports and ATM ports. Each ATM port comprising a hardware forwarding engine for bridging LAN frames from the LAN ports to the ATM port. The hardware forwarding engine converts layer 2 protocols between the dissimilar ports expediently, without requiring intervention by a microprocessor. A substantial performance gain is attained compared to microprocessor controlled format converters. Both LAN emulation and virtual LANs are supported.

4 Claims, 12 Drawing Sheets

| 7 | APPLICATION LAYER | PROVIDES A MEANS FOR APPLICATION PROCESS TO COMMUNICATE WITH ONE ANOTHER THROUGH THE OSI SYSTEM. CONTAINS MANAGEMENT FUNCTIONS TO SUPPORT DISTRIBUTED APPLICATIONS. |
|---|---|---|
| 6 | PRESENTATION LAYER | PROVIDES REPRESENTATION OF INFORMATION TO APPLICATION LAYERS IN A WAY THAT PRESERVES THE MEANING WHILE RESOLVING ANY DIFFERENCES IN FORMAT AND DATA REPRESENTATION BETWEEN THE APPLICATION SYSTEMS. |
| 5 | SESSION LAYER | PROVIDES THE MEANS NECESSARY TO COORDINATE DIALOGUE BETWEEN PRESENTATION ENTITIES. |
| 4 | TRANSPORT LAYER | PROVIDE END-TO-END CONTROL TO ALLOW FOR ERROR RECOVERY AND DETECTION TO THE HIGHER LAYERS. |
| 3 | NETWORK LAYER | ESTABLISHES, MAINTAINS, AND TERMINATES NETWORK CONNECTIONS BETWEEN END SYSTEMS. RESPONSIBLE FOR CONTROLLING THE FLOW OF DATA TO THE NETWORK. |
| 2 | LINK LAYER | PROVIDES SYNCHRONIZATION AND ERROR CONTROL FOR INFORMATION TRANSMITTED OVER THE PHYSICAL LINK. |
| 1 | PHYSICAL LAYER | PROVIDES ELECTRICAL, MECHANICAL, FUNCTIONAL, AND PROCEDURAL CHARACTERISTICS REQUIRED FOR THE PHYSICAL LINK. |

*FIG. 1* (PRIOR ART)

METHOD AND APPARATUS FOR HARDWARE FORWARDING OF LAN FRAMES OVER ATM NETWORKS

This is a Divisional of U.S. Ser. No. 09/515,746 filed on Feb. 29, 2000.

BACKGROUND OF THE INVENTION

1. Technical Field of the Invention

The present invention relates to local area network switching apparatuses for routing and bridging data transfers to other networks of a different type. The invention further relates to transferring messages between networks having non-compatible network interfaces and different data link protocols. The disclosed system relates to bridging between networks using special-purpose hardware.

2. Background Art

Presently, numerous types of networks coexist in the telecommunication industry, such as Local Area Networks (LANs), Wide Area Networks (WANs), X.25 Networks, Integrated Services Digital Networks (ISDNs), and Asynchronous Transfer Mode (ATM) Networks. Because of the existence of different networks and standards, there is a need in the telecommunications industry for communication between data processing devices connected to heterogeneous networks. As an example, owners of previously installed LANs frequently want to connect to the emerging broad band Integrated Services Digital Network (ISDN) or ATM Networks.

In a worldwide effort to harmonize the development of networks and the data processing devices associated with them, international organizations like the Comite Consultatif International de Telegraphe et Telephone (CCITT), the European Computer Manufacturers' Association (ECMA), and the International Organization for Standardization (ISO) have established standards for each type of network. ISO has developed a general framework to serve as a reference for all existing and future standards, called the reference model of Open Systems Interconnection (OSI). Most existing and newly developed standards claim to be OSI compatible. This model is a universally applicable logic structure or layered architecture, containing seven layers as shown in FIG. 1. Each layer has a set of defined functions and provides a set of services to and from the adjacent two layers.

LAN switches are widely used by industry to interconnect multiple Ethernet or Token Ring LANs through a switch so that devices on one LAN can communicate with devices on other LANs. New LAN switches are being developed to interconnect networks having various data link (layer 2) protocols to enable various LAN segments to connect to ISDN or ATM networks. This merging technology requires a format conversion between the different protocols used on the networks.

Much prior art has dealt with the format conversion of one network protocol to another. In U.S. Pat. No. 5,341,376, "An ATM Cell Format Conversion System," Yamashita teaches an ATM cell format conversion system. ATM means Asynchronous Transfer Mode, which is the current popular method for transmitting speech, data, and pictures over the Internet. An ATM cell is the basic unit in which data is transmitted. An ATM cell is comprised of 53 octets of data, where an octet is another term for byte or eight bits of data. The 53 octets are subdivided into five octets for carrying header information for the message being transmitted including the message destination and 48 octets for carrying message data. A message is segmented into ATM cells as it is sent to the Internet and then reassembled from ATM cells at the destination.

Yamashita has found that when transmitting messages formatted into 53 ATM octets over telephone lines using older techniques, such as Synchronous Transfer Mode (STM), the standard ATM format is not totally compatible. For STM, Yamashita found that better efficiency can be attained for transmitting ATM cells over STM media by adding an idle (dummy) octet to each ATM cell and thus comprising an ATM cell of 54 octets rather than 53. Yamashita teaches an ATM cell format conversion system to generate 54 octet cells from 53 octets cells. Like Yamashita, the present invention uses ATM transmissions, but Yamashita does not use the standard ATM format. Yamashita converts the basic ATM format of transmission from 53 to 54 octets. This makes Yamashita's ATM non-standard and not used by the rest of the industry. The present invention uses the standard ATM solution having 53 octets, never attempts to modify the standard approach, and does not use Yamashita's invention.

In U.S. Pat. No. 5,323,392, "Adaption Device and Method for Efficient Interconnection of Data Processing Devices and Networks" by Ishii et al., Ishii teaches an adaption device for connecting processing devices and networks which have different protocols. Ishii's adaption device for connecting processing devices and networks which have various layer 2 (link layer) protocols of the HDLC (High Level Data Link Control) type. HDLC is the standard used most commonly for layer 2.

Ishii's adaption device interconnects two different protocols of the HDLC generic type: 1) Link Access Procedure on the D Channel (LAPD), which is Link Access Procedure Balanced (LAPB), which is specific to LANs. An HDLC frame, incoming from a first data processing device complying to the first layer 2 protocol of the LAPB type, is stored within the adaption device. The frame is then mapped to a second layer 2 protocol of the LAPD type and forwarded to a network interface. The layer 2 mapping function resides in a Programmable Read-Only Memory (PROM), a receive frame is stored in adapter memory, and the mapping function between layer 2 protocols is done by a microprocessor.

The present invention, like Ishii, features methods for adapting different layer 2 protocols. The present invention maps switch header to ATM control header but uses hardware rather than a processor to do the mapping function. Ishii's solution is related to slower network transfer rates where slower microprocessor controlled mapping is permissible. The present invention is for higher speed networks where Ischii's processing mapping speeds are not acceptable.

In U.S. Pat. No. 5,581,558, "Apparatus for Bridging Non-Compatible Network Architectures" by Horney et al, Horney teaches a bridging apparatus for sending data to and from a local area network (LAN) from and to a wide area network (WAN). Horney's invention also deals with the OSI model of layered protocols of FIG. 1 and with various layer 2 protocols. Horney chooses a popular wide area network standard called X.25, which is based on the Comite Consultatif International de Telegraphe et Telephone (CCITT) definition of the lower three layers of the OSI model. Horney converts the X.25 protocol to a 1 Mb (StarLAN) local area network, which is an IEEE 802.3 Carrier Sense multiple Access with Collision Detection ((CSMA/CD) LAN protocol. The layer 2 mapping function resides in a Read-Only Memory (ROM), a receive frame is stored in adapter memory, and the mapping function between layer 2 protocols is done by a microprocessor.

Both Horney and the present invention feature methods for bridging data between different layer 2 protocols. However, the present invention maps switch header to ATM control header but uses hardware rather than a processor to do the mapping function. Horney's solution is related to slower network transfer rates (56 Kbits/sec) where slower microprocessor mapping is permissible. The present invention is for higher speed (155 Mbits/sec) networks where processing mapping speeds are not acceptable.

In U.S. Pat. No. 5,577,039, "System and Method of Signal Transmission within a Plesiochronous Digital Hierarchy Unit Using ATM Adaption Layers" by Won et al., Won teaches a format conversion system for converting the plesiochronous digital hierarchy (PDH) data transmission format to the ATM data transmission format and for converting ATM to PHD. PHD is a scheme for multiplexing several 64 Kbit/sec ISDN channels together to produce a higher bit rate signal. Like the other prior art solutions, Won uses memory and a microprocessor in the conversion system to perform the mapping functions between the two protocols being converted. The present invention neither maps PDH to ISDN nor uses microprocessor control in bridging between networks.

In U.S. Pat. No. 5,619,650, "Network Processor for Transforming a Message Transported from an I/O Channel to a Network by Adding a Message Identifier and then Converting the Message" by Bach et al, Bach teaches converting an I/O Channel format to a LAN format. Bach's invention for the most part is not related to the present invention. Both Bach and the present invention feature methods for adapting two dissimilar interfaces; however, the present invention maps switch header to ATM control header but uses hardware rather than a processor to do the mapping function. Bach maps a standard I/O Channel to a LAN using a processor.

In U.S. Pat. No. 5,568,477, "Multipurpose Packet Switching Node for a Data Communication Network" by Galand et al., Galand teaches a multi-purpose packet switching network node capable of switching packets received on any number of node input ports to any number of output ports. The node can receive either ATM cells or variable length messages on any input and switch that input to any switch output of the node. Reformatting is involved of both ATM or variable length (VL) messages to a packet format, which is basically comprised of pseudo ATM packets that carry segmented VL data.

Both Galand and the present invention feature methods for adapting a protocol to the ATM cell format and both apply to switches. However, Galand's solution adapts a variable length message, like that used for a circuit switch, to the ATM cell format using a microprocessor and defines a switch that switches ATM cells. The present invention uses a switch that switches LAN frames and not ATM cells.

The present invention also teaches an increased throughput capability between networks. Prior art includes U.S. Pat. No. 5,457,681, "ATM-Ethernet Portal/Concentrator" by Gaddis et al. Gaddis teaches an Ethernet to ATM converter. Gaddis expands the distance an Ethernet segment (which is a LAN) can transmit a message by connecting the Ethernet segment to an ATM Network. In fact, Gaddis connects multiple Ethernet segments to a multi-ported ATM Network, whereby he enables a first Ethernet segment to send messages to a second Ethernet segment through the ATM Network. Gaddis features a dual-ported memory with the ATM input and output controlled by a DMA controller and the Ethernet input and output controller by an Ethernet controller. A processor is required to control and program both the DMA and Ethernet controllers. Messages from either source are stored in the dual-ported memory depending on which direction the message is traveling. Both Ethernet and ATM headers are generated directly from the memory with the help of the controllers. This method also enables message broadcast to occur from the dual-ported memory, thus eliminating a need to copy the data from an external memory if the message is broadcast.

Gaddis claims the invention to be used as either a portal or a concentrator, where a portal connects one Ethernet segment to one port of an ATM network and a concentrator connects multiple Ethernet segments to one ATM network. For the concentrator, a bus is used to interconnect the multiple Ethernet segments, and the bus goes to one port of the dual-ported memory. The bus becomes a bottleneck for the concentrator, and the performance is questionable and depends upon improving the performance of the bus.

Both Gaddis and the present invention feature methods for connecting LANs to ATM networks and for converting messages in LAN formats to messages in ATM format. The present invention only deals with a switching approach for interconnecting multiple LANs to multiple ATM ports. Multiple connections are supported simultaneously through the LAN port switch. The present invention is neither a single portal approach nor a concentrator. Gaddis's invention functions as a portal or a concentrator and does two basic operations: 1) converts Ethernet messages to ATM messages and 2) converts ATM messages to Ethernet messages. In contrast, the present invention is for a LAN switch or hub which either bridges or routes LAN messages or ATM messages. The present invention also performs LAN emulation and supports virtual LANs. Gaddis uses software control by a processor, and the present invention is more efficient using an all hardware solution.

In U.S. Pat. No. 5,303,344, "Protocol Processing Apparatus for use in Interfacing Network Connected Computer Systems Utilizing Separate Paths for Control Information and Data Transfer" by Yokoyama et al., Yokoyama teaches a communication control equipment connected between a computer and a network to expedite the sending and receiving of messages. The control of the complete message prior to Yokoyama's invention was accomplished by the software of the computer only. A communication control equipment is introduced as new hardware to take the some of the processing burden off of the computer. The computer still does some of the message control, and some is off-loaded to the new hardware. The invention takes mainly a parallel processing approach in that the communication control equipment is comprised of multiple processors, each of which relieve the computer of one of the message control tasks.

There is a similarity between Yokoyama and the present invention in that both use additional hardware to improve the speed of processing messages. Another slight similarity is that Yokoyama splits a single message into two different processing paths internal to his additional hardware. Likewise, the present invention uses two different processing paths. However, Yokoyama uses multiprocessors in his new hardware to improve the performance of messages, where the present invention uses special-purpose hardware to further improve performance. The present invention is better, because general purpose processors cannot handle a specific task as quickly as special hardware can.

Yokoyama splits a single message into two paths sending control information down one path and data down the other.

The present invention segregates different types of messages by path, sending bridged messages requiring layer 2 conversions down one path in their entirety and routed messages requiring layer 3 conversions down a second path in their entirety. In addition, Yokoyama deals with the scenario of a plurality of computers connected to a network. Communication between computers uses a single homogeneous message protocol, where all messages are comprised of the exact same protocol and format. The protocol includes a complex control structure, wherein first a sequence of messages is used to establish a connection through the network by the computer requesting a specific connection, the network establishing the connection path and sending an acknowledge message back to the computer. Next, the computer sends data over the established connection, wherein a single or multiple messages can be transferred. When the computer is finished using the connection, it then sends a message to break the connection. In contrast, the present invention deals with a switch hub scenario which receives heterogeneous messages of various protocols from local area networks (LANs) and Asynchronous Transfer Mode (ATM) messages. The heterogeneous messages are either routed by the switch hub or bridged from one hub input port to another hub output port. The present invention therefore deals with multiple different message protocols and converts a first message protocol to a second message protocol using special purpose hardware (no processor) to expedite the conversion.

Other prior art which is not as closely related is disclosed in the article, "High-Speed Serial Interface MicroChannel Adapter", in the *IBM Technical Disclosure Bulletin*, Vol. 34, No. 7A, December 1991. The article discloses a High-Speed Serial Interface (HSSI) for transferring data at 52 Mbit/sec using a pseudo standard which was jointly developed by T3plus Networking and Cisco Systems. The disclosure is of an apparatus for connecting the MicroChannel bus to the HSSI interface. Both the *IBM Technical Disclosure Bulletin* (*TDB*) and the present invention feature methods for adapting two dissimilar interfaces. However, the IBM TDB deals with connecting a computer bus to a serial interface, not with interconnecting multiple networks through a switch.

It is the object of this invention to sort incoming LAN messages at each ATM port of the switch into two different paths for efficient routing or bridging between dissimilar networks.

It is a further object of this invention to provide a high performance bridging path between dissimilar networks by implementing the bridging path as a hardware forwarding engine for transmitting LAN frames between LAN ports and ATM ports of the LAN switch.

It is a further object of this invention to provide LAN emulation over ATM networks which permits LAN frames to be transmitted between two different LAN segments interconnected by an ATM network.

It is a further object of this invention to convert formats between different layer 2 protocols using special purpose hardware without the aid of a microprocessor.

It is a further object of this invention to provide two different types of memory queues, one being a software queue of frames to be processed by a microprocessor and the other being a hardware queue of frames to be processed by a hardware forwarding engine.

SUMMARY OF THE INVENTION

In accordance with the invention, a LAN switch is provided for bridging messages in the form of LAN frames between LAN segments and ATM networks. A plurality of LAN switch ports are a mix of LAN ports and ATM ports for transmitting messages to and from LAN segments and to and from ATM network. Format conversion is required at the ATM ports between the incompatible OSI layer 2 and 3 protocols of the LAN frames and the ATM network.

For transmitting LAN frames from a LAN port to an ATM port, the ATM port sorts the incoming messages arriving from the LAN port through the switch to the ATM port. The ATM ports sort incoming LAN messages to determine if they are to be discarded, sent to another LAN, routed, or bridged. The route verses bridge decision is based on whether layer 3 conversion is required or not. LAN frames requiring layer 3 conversion are called routed frames, and LAN frames not requiring layer 3 conversion are called bridged frames.

Bridged frames require only layer 2 data link protocol conversion, and special-purpose hardware means are provided to convert the arriving LAN frame having a switch header prefix. The switch header is removed and replaced by ATM control device header. The LAN frame prefixed with the ATM control header is sent to an ATM controller device. The ATM controller device is an Application Specific Integrated Circuit (ASIC) which segments/reassembles ATM cells for transmission to and from the ATM network. The ATM controller device header is in a form that is understood by the ATM controller device, and no other conversion is required by the special-purpose hardware.

In further accordance with the invention, a LAN emulation means is provided for transmitting and receiving LAN frames from one LAN segment to a port of a first LAN switch, through the LAN switch to a first destination ATM switch port, converting to ATM cell format, transmitting the frame over the ATM network to a second ATM port of a second LAN switch, reassembling the LAN frame, and sending the reconstructed LAN frame to a second LAN segment connected to a LAN port of the second switch. The ATM network then appears to emulate a LAN, since a LAN frame travels intact from the first LAN segment through the ATM to a second LAN segment. The LAN frame arriving at the second LAN segment appears as if first and second segments were connected directly through a LAN switch and had never undergone conversion to the ATM format. The LAN emulation is provided by a LAN emulation header, which is sent with the LAN frame over the ATM network to carry information that is required to reconstruct the LAN frame after exiting the ATM network.

Other features and advantages of this invention will become apparent from the following detailed description of the presently preferred embodiment of the invention, taken in conjunction with the accompanying drawings.

BRIEF DESCRIPTION OF THE DRAWINGS

FIG. 1 is a diagram showing the reference model of the Open Systems Interconnection (OSI) organization comprised of a universally applicable layered architecture, containing seven layers according to the prior art.

DETAILED DESCRIPTION OF THE PREFERRED EMBODIMENT

In accordance with the invention, a LAN switch is provided for bridging messages in the form of LAN frames between LAN segments and ATM networks. A plurality of LAN switch ports are a mix of LAN ports and ATM ports for transmitting messages to and from LAN segments and to and from ATM networks. The preferred embodiment is a plurality of LAN ports being switched to connect to each other and to one ATM port.

Referring to FIG. 1 (prior art), the present invention is compatible with the communication standard provided by the reference model of the Open Systems Interconnection (OSI). This model is a universally applicable logic structure or layered architecture, containing seven layers as shown in FIG. 1.

Each layer has a set of defined functions and provides a set of services to and from the adjacent two layers. The present invention applies to two of the lower layers, layers 2 and 3. The layer 1 physical connections are well defined and unchangeable. Layer 1 includes physical connectors, wiring, and transmission sequences.

The invention applies mainly to layer 2, the data link layer, and to layer 3, the network layer. Format conversion is required at the ATM ports between the incompatible OSI layers 2 and 3 protocols of the LAN frames and the ATM network.

Figure 2:
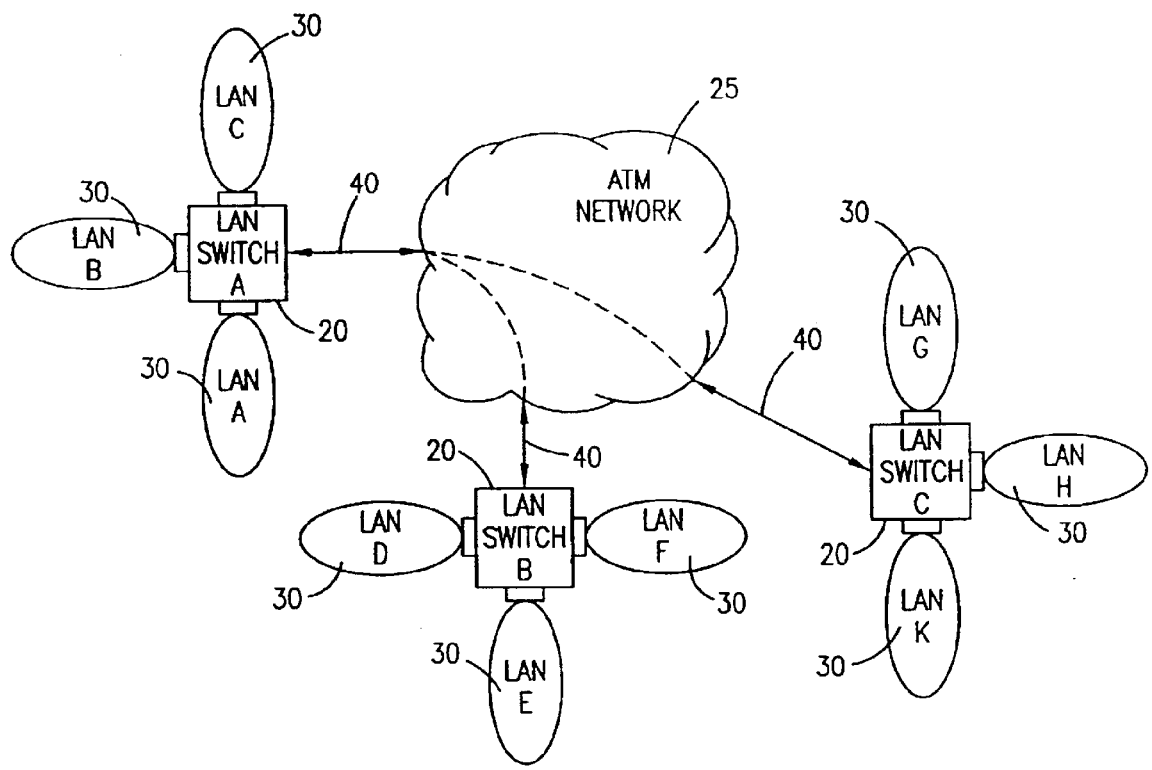
FIG. 2 is a diagram showing the interconnection of LANs to the ATM network using LAN switches according to the preferred embodiment of this invention.

Referring to FIG. 2, the preferred embodiment is shown. A plurality of LAN switches 20 interconnect multiple LAN segments 30 with an ATM network 25. The LAN switch in the prior art interconnected a plurality of LAN segments, such as a plurality of computer terminals, personal computers, or workstations within an office building, wherein each segment connecting the computer terminals, personal computers, or workstations was located on a different floor of the building. The LAN switch interconnects all floors to enable the transmission of data messages configured as LAN frames between floors. The present invention adds ATM ports and an efficient hardware format conversion and forwarding engine to the prior art LAN switch, making it possible to interconnect multiple LAN segments 30 that are connected to different LAN switches 20 via ATM network 25.

For instance, LAN segment A can connect to LAN segments B, C internal to LAN switch A. However, LAN segment A can also connect to ATM network 25 though link 40 and form a virtual channel connection across ATM network 25 to connect to LAN switches B or C. Thus, LAN A can be connected to LANs D to K across the wide area ATM network 25. As a data message is transmitted across the ATM network, the message maintains the LAN frame format even though the frame is segmented into ATM cells at the ATM port of LAN switch 20 for transmission across the ATM network 25 and then reassembled into a LAN frame at the ATM port of the LAN switch 20 on the other side of the ATM network.

ATM network 25, although not a LAN itself, emulates a LAN and makes it appear like LAN A is connected to LAN K (for instance) through a local LAN switch 20 when, in reality, LANs A and K can be very far apart as ATM network 25 is very flexible (like telephone lines) and can connect two LANs in the same building, town, country, or world. The ability to support LAN frame traffic between LAN segments by traversing over an ATM network is referred to as a virtual LAN system, since the operation at the end point is consistent with normal LAN operation but the ATM network interconnecting the LANs is itself not a LAN. Thus, the present invention permits local area networks to expand their range to include interconnection to any LAN connected to ATM network 25 and to transfer data at the highest possible rate.

Figure 3:
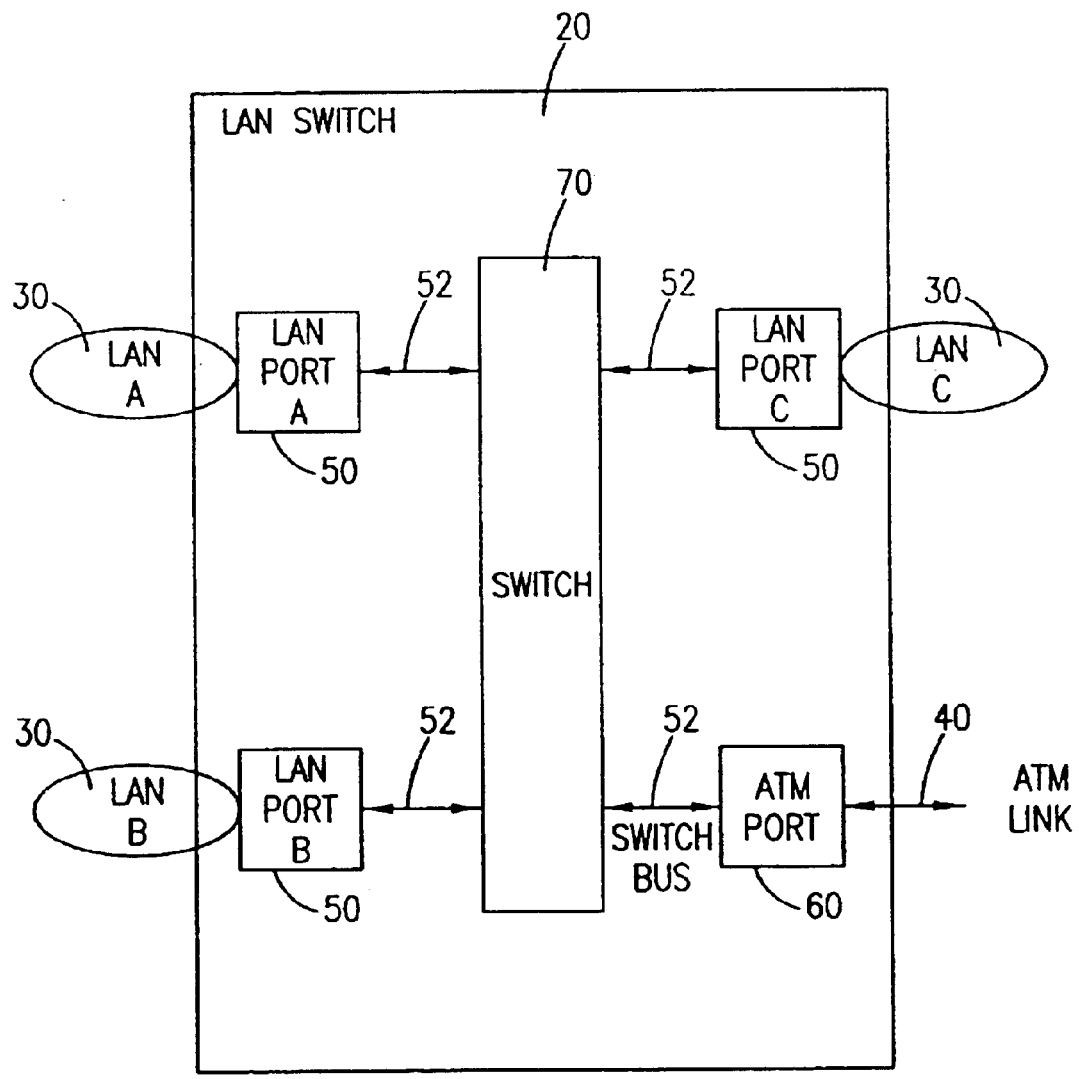
FIG. 3 shows a block diagram of the LAN switch comprising LAN ports and ATM ports according to the preferred embodiment of this invention.

Referring to FIG. 3, the preferred implementation of LAN switch 20 has, for example, three LAN ports 50 and one ATM port 60. Ports 50, 60 are interconnected by switch 70 such that any of the LAN ports 50 can be switched to connect to any other LAN Port 50 or ATM port 60. Likewise, ATM port 60 can be switched to connect to any LAN Port 50. Switch 70 is capable of supporting multiple connections simultaneously and is bi-directional. The interface to and from switch 70 is bi-directional switch bus 52. The interface to each port 50, 60 is switch bus 52 regardless of the port type or number of ports supported by switch 70.

The present invention is for special-purpose hardware residing in ATM port 60 of LAN switch 20 for expediently handling format conversion and frame forwarding between two dissimilar networks. The invention incorporates dual hardware functions, one for converting LAN/switch frame formats to ATM frame formats and one for converting ATM frame formats to LAN/switch frame formats.

Figure 4:
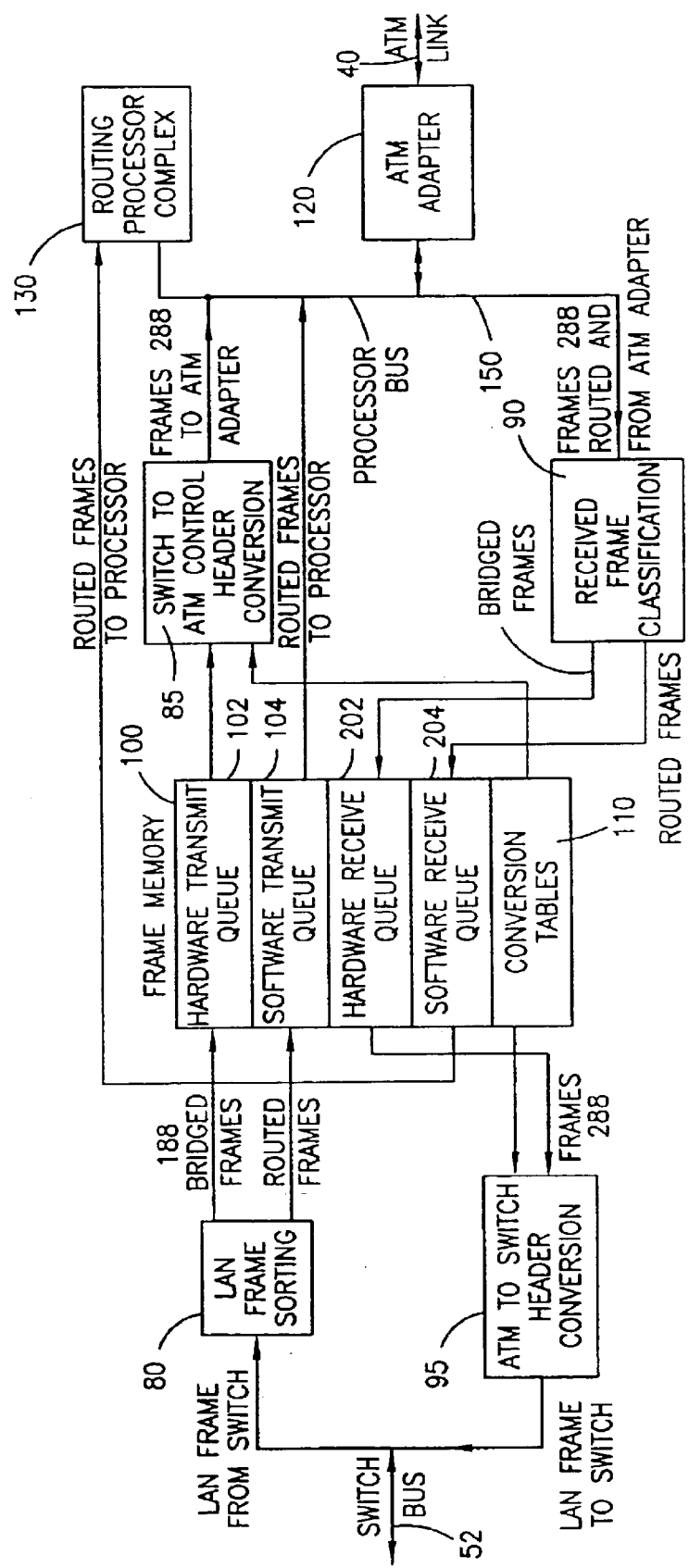
FIG. 4 shows a block diagram of the ATM port for converting LAN frames to ATM frames according to the preferred embodiment of this invention.

Referring to FIG. 4, a block diagram of the special-purpose hardware is shown. The special hardware for converting LAN/switch frame formats to ATM frame formats includes LAN frame sorting logic 80 for receiving and sorting LAN frames received from switch 70 (shown in FIG. 3) over switch bus 52. The LAN frames are sorted for either software or hardware processing. The frames to be processed by hardware are stored in hardware queue 102 of frame memory 100, and the frames to be processed by software are stored in software transmit queue 104 of frame memory 100. LAN frames queued for software processing in software transmit queue 104 are sent to routing processor 130 to be processed. LAN frames queued for hardware processing in hardware transmit queue 102 are sent to switch-to-ATM header conversion logic 85 to be processed. Switch-to-ATM header conversion logic 85 converts from the LAN frame format coming from the switch to the emulated LAN frame format required by the ATM adapter 120. The ATM adapter 120 contains an ATM controller ASIC for converting to and from an ATM transmission form. The standard ATM transmission format is the ATM cell. The ATM cell is comprised of 53 octets of data, where an octet is another term for byte or eight bits of data. The 53 octets are subdivided into five octets for carrying header information including the channel to be used for transmission through the ATM network and 48 octets for carrying message data. A message is segmented and transmitted across ATM network 25. On the other side of the network, the cells are received and reassembled from ATM cells at the destination. ATM adapter 120 performs both the transmission and receiving functions; i.e., block 120 segments out-going messages and reassembles incoming messages.

The special hardware for converting ATM frame formats to LAN/switch frame formats includes ATM frame classification block 90 for receiving a LAN frame that has been reassembled from ATM cells into ATM frame format by ATM adapter 120. ATM frame classification block 90 sorts the ATM frames for either software or hardware processing. The frames to be processed by hardware are stored in hardware receive queue 202 of frame memory 100, and the frames to be processed by software are stored in software receive queue 204 of frame memory 100. Frames queued for software processing in software receive queue 204 are sent to routing processor 130 to be processed. Frames queued for hardware processing in hardware receive queue 202 are sent to ATM-to-switch header conversion logic 95 to be processed. ATM-to-switch header conversion logic 95 converts from the ATM frame format to the LAN format required by switch 70. The frame converted back to a LAN frame is sent through switch 70 over switch bus 52 and routed to one or more of the LAN ports 50 of LAN switch 20.

The hardware conversion of frames in both hardware queues 102, 202 require look-up table operations to perform the specified format conversions. For the preferred embodiment, the conversion tables 110 are stored in frame memory 100. For other embodiments, all or some of these tables are stored in discrete memories. The detailed use of conversion tables 110 is explained hereinafter.

Transmitting LAN Frames to ATM

Figure 5:
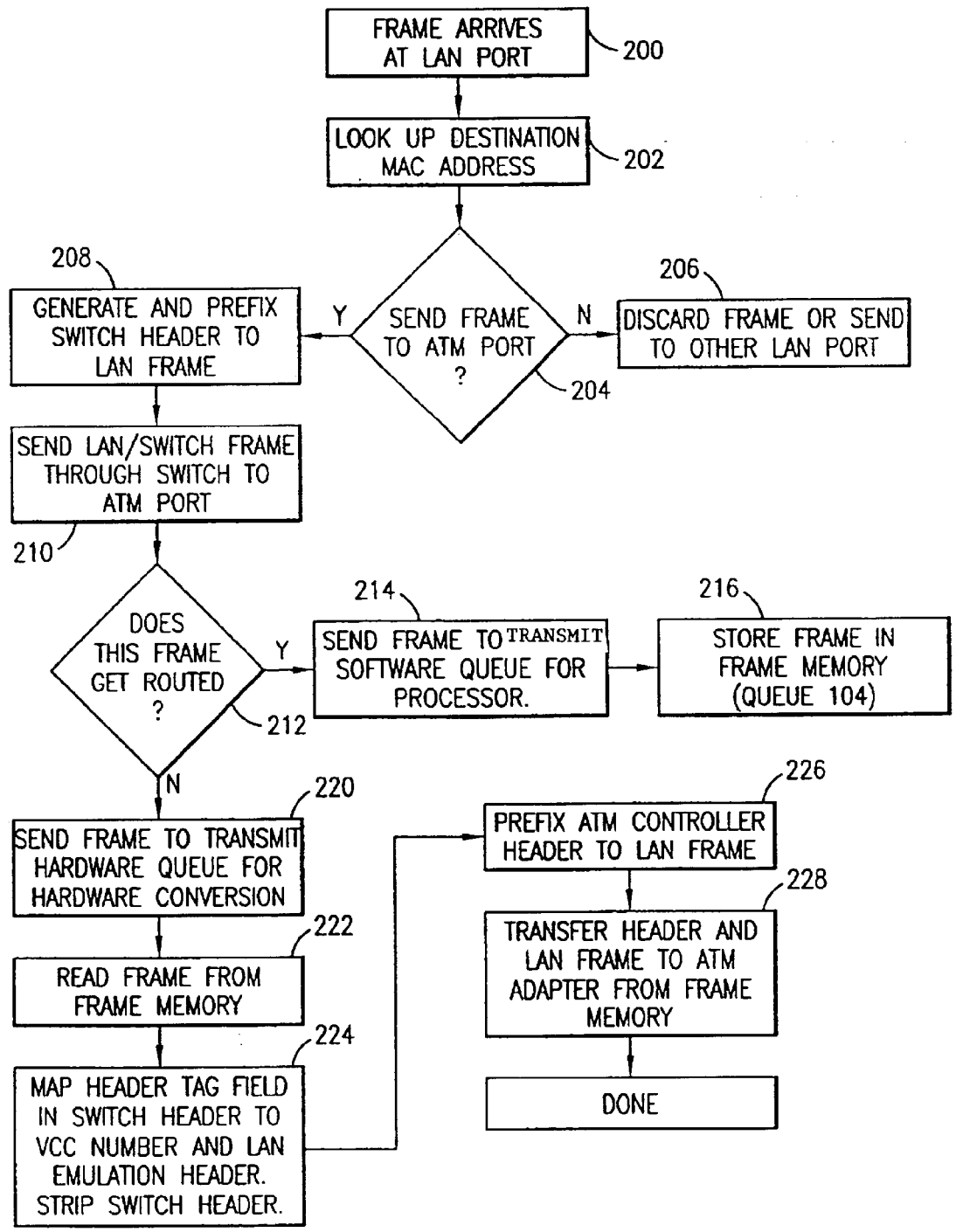
FIG. 5 is a flow chart of the operation for transmitting and converting a LAN frame to the ATM network according to the preferred embodiment of this invention.

Referring to FIG. 5, a flow diagram is shown of the transmit operation. For transmitting LAN frames from LAN port 50 to an ATM port 60, the LAN frame first arrives from a LAN 30 to a LAN port 50 (see FIG. 3) as shown by block 200. The LAN port 50 applies the MAC address portion of the LAN frame to perform a look-up for conversion tables 110 to determine what action is to be taken with the LAN frame, as shown in block 202. MAC stands for Media Access Control, which is the bottom sublayer of the data link layer 2 (see FIG. 1). LAN port 50 makes a decision to determine if the frame is to be discarded, sent to another LAN, or sent to ATM port 60, as shown in block 204. The decision to discard or send to another LAN port 50 is shown in block 206. Note that this path is not pertinent to the present invention and its flow is not followed in FIG. 5. The path of interest is shown by block 208, where the LAN frame destination is ATM port 60. In this case a switch header is prefixed to the LAN frame by the LAN port 50. The LAN frame with switch header attached is the LAN/switch frame 188; i.e., the LAN frame that is sent through switch 70.

Figure 6:
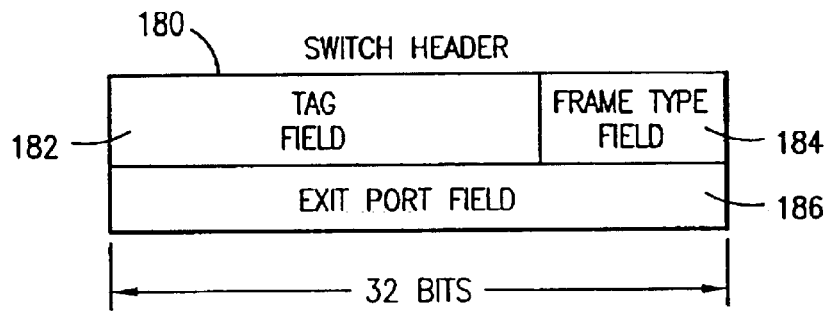
FIG. 6 is a diagram showing the composition of the switch header for transmitting a LAN frame through a LAN switch according to the preferred embodiment of this invention.

Referring to FIG. 6, the content of the switch header 180 is shown. Switch header 180 is comprised of two 32-bits words for defining tag field 182, frame type field 184, and exit port field 186. Tag field 182 contains a binary address to be applied to conversion table 110 for looking up control data in the tables 110 to aid in the hardware conversion of the LAN/switch frame 187 to the ATM frame 288. Type field 184 contains information about the type of frame, such as abort frame, CRC is included in frame, and other control descriptors. Exit port field 186 determines which port 50 or 60 the LAN/switch frame is sent to through switch 70. Each of the 32 bits in the exit port field is used to select a different destination. If the bit associated with a port 50 or 60 is set to 1, that port is selected to receive frame 187. Each LAN port 50 requires one associated bit in the exit port field 186. Each ATM port 60 requires two associated bits in the exit port field 186. Thus, the preferred embodiment, comprising three LAN ports 50 requiring one bit each and one ATM port 60 requiring two bits, uses five bits exit port field 186. Other LAN switch 20 embodiments having more ports 50 and 60 using more bits in exit port field 186.

Referring now back to FIGS. 4 and 5, the next step sends the LAN/switch frame through switch 70 to ATM port 60 as shown by block 210. The ATM ports sort incoming LAN messages to determine if they are to be routed or bridged as shown by block 212. The route verses bridge decision is based on the 2 exit ports assigned to ATM ports in switch header 180. Frames sent to the first exit port are routed, and frames sent to the second exit port are bridged. Routed frames require layer 3 format conversion and bridged frames require layer 2 format conversion.

Figure 7:
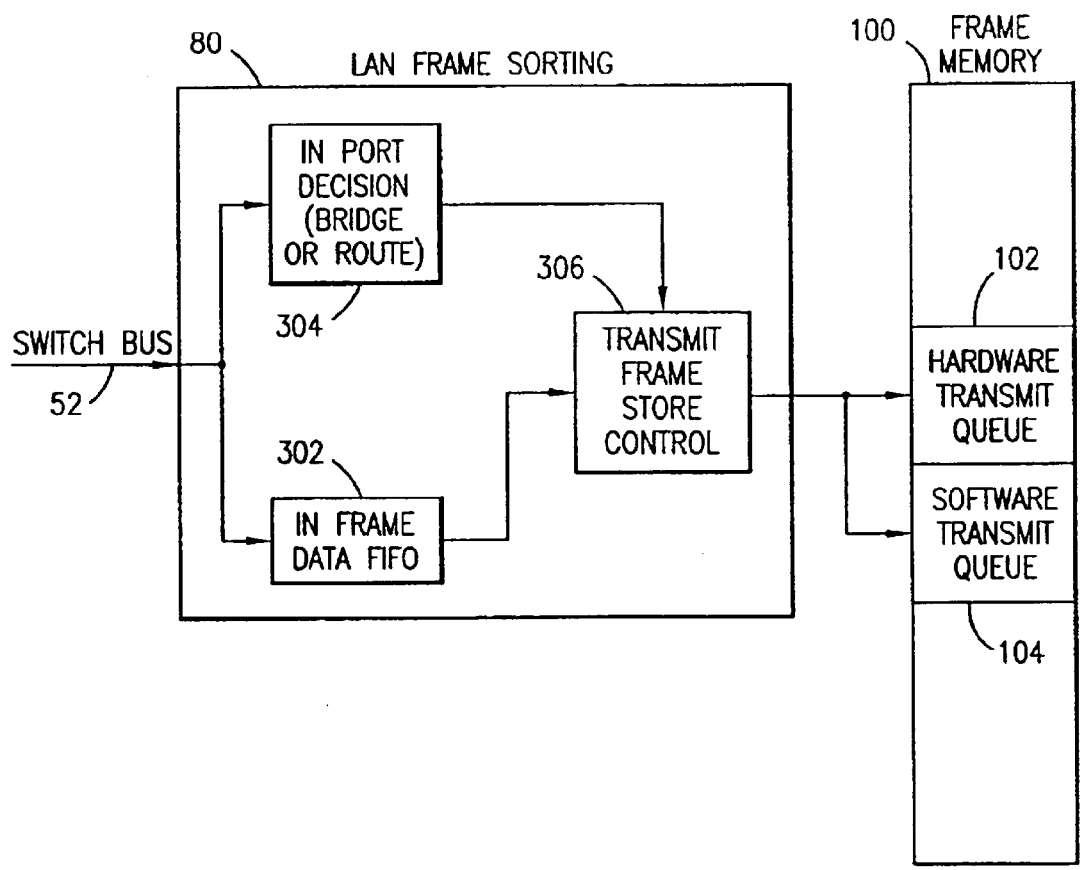
FIG. 7 is a block diagram showing the sorting of incoming LAN frames into bridged frames and routed frames according to the preferred embodiment of this invention.

Referring to FIG. 7, a block diagram is shown with further details of LAN frame sorting logic 80 of FIG. 4. Block 80 receives the incoming LAN frame 188 as it arrives from switch 70 over switch bus 52. The incoming frame 188 is temporarily buffered in IN frame data FIFO (First-In, First Out) buffer 302. Block 212 of FIG. 5 shows the first flow decision at the ATM port 60 to be a checking of the exit port field 186 of switch header 180 to determine if the frame is routed or bridged. The IN decision block 304 of FIG. 7 makes and stores the routed verses bridged decision.

Routed frames require layer 3 data link protocol conversion, which is more complex than layer 2 conversion. Routing processor 130 (shown in FIG. 4) is used to process routed frames. Blocks 214 and 216 of FIG. 5 show a truncated flow path for routed frames. Block 306 of FIG. 7 sends the routed frames to the tail of software transmit queue 104, from which they are read by processor 130. The routed frames are converted using standard software procedures and are not pertinent to the present invention. Therefore, the flow of routed frames is not followed in FIG. 5.

Bridged frames require only layer 2 data link protocol conversion, and special-purpose hardware means are implemented in the switch-to-header conversion block 85 (shown in FIG. 4) to convert bridged frames quickly and efficiently without requiring processor intervention. Bridged frames are stored to hardware transmit queue 102, from which frame 188 is read to block 85 of FIG. 4, as shown by block 220 of FIG. 5. The storing of the incoming frame 188 to queue 102 is controlled by block 306, which places the frame at the tail of queue 102. There are four queues 102, 104, 202, 204 shown in FIG. 4 that are mapped as FIFOs into frame memory 100 of FIG. 7 and FIG. 4. Each queue stores multiple frames and has a head and a tail. Frames are added to the tail of queue 102 by block 306, which keeps track of the frame memory 100 address where the tail of the queue is located. Bridged frames are taken from the head of queue 102 and processed by block 85, which keeps track of the frame memory 100 address where the head of the queue is located.

Figure 9:
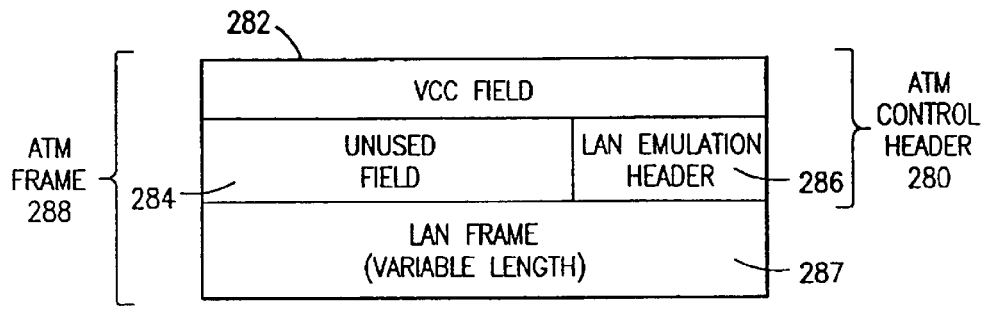
FIG. 9 is a diagram showing the composition of the ATM control header for prefixing an ATM frame for transmission to the ATM interface adapter according to the preferred embodiment of this invention.

Blocks 220 and 222 of FIG. 5 show the next steps of reading each frame from frame memory 100, in turn, from the head of queue 102 and then performing the hardware format conversion and forwarding. The queues 102, 104, 202, 204 provide buffering to smooth the transfer rates from the LAN to ATM and ATM to LAN. The frame is read from frame memory 100 under the control of block 310 of FIG. 8. The switch header 180 is sent to hardware format converter block 312. Block 312 uses the tag field as an address to conversion tables 110 in frame memory 100 of FIG. 4 and accesses directly from table 110 the information required to convert formats. The format conversion involves replacing the switch header 180 of frame 188 with ATM control header 280, which is shown in FIG. 9. The switch header 180 is stripped in its entirety from frame 187 and ATM control header 280 is added to make an ATM frame 288. The ATM frame 288, shown in FIG. 9, is comprised of the LAN frame 287 as received from LAN 30 into LAN port 50 prefixed with ATM control header 280.

Referring to FIG. 9, ATM control header 280 is comprised of virtual channel connection (VCC) field 282 for defining the transmission channel when sending the frame through the ATM network, unused field 284, and LAN emulation header 286. The use of the LAN emulation header 286 will be discussed in detail hereinafter.

Referring back to FIG. 8, hardware format converter 312, after addressing tables 110 destroys switch header 180, reads ATM control header 280 from tables 110, and stores ATM control header 280 until it is needed. Block 310 informs ATM enqueue logic 314 that a LAN frame conversion to the ATM frame format 288 is ready to send to the ATM adapter 120. Referring to FIG. 10A, a simplified diagram of ATM Adapter 120 shows the three major functional blocks of ATM Adapter 120: ATM memory 122, segmenter 124, and reassembler 126. ATM memory 122 stores a plurality of frames 288 to be transmitted to the ATM network 25. The ATM adapter 120 contains an ATM controller ASIC which segments/reassembles ATM cells for transmission to and from the ATM network. ATM memory 122 also stores a plurality of frames 288 which are being received from ATM network 25 and reassembled in reassembler 126. Segmenter 124 reads ATM frames from ATM memory 122 and segments them into 53-byte ATM cells for transmission to the ATM network 25.

Figure 10B:
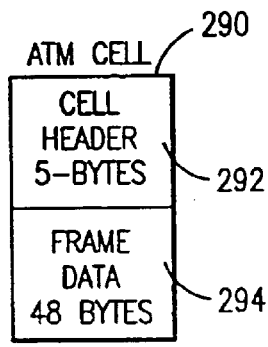
FIG. 10B is a diagram showing the basic composition of the ATM cell for transmission to and from the ATM network according to the preferred embodiment of this invention.
Figure 10A:
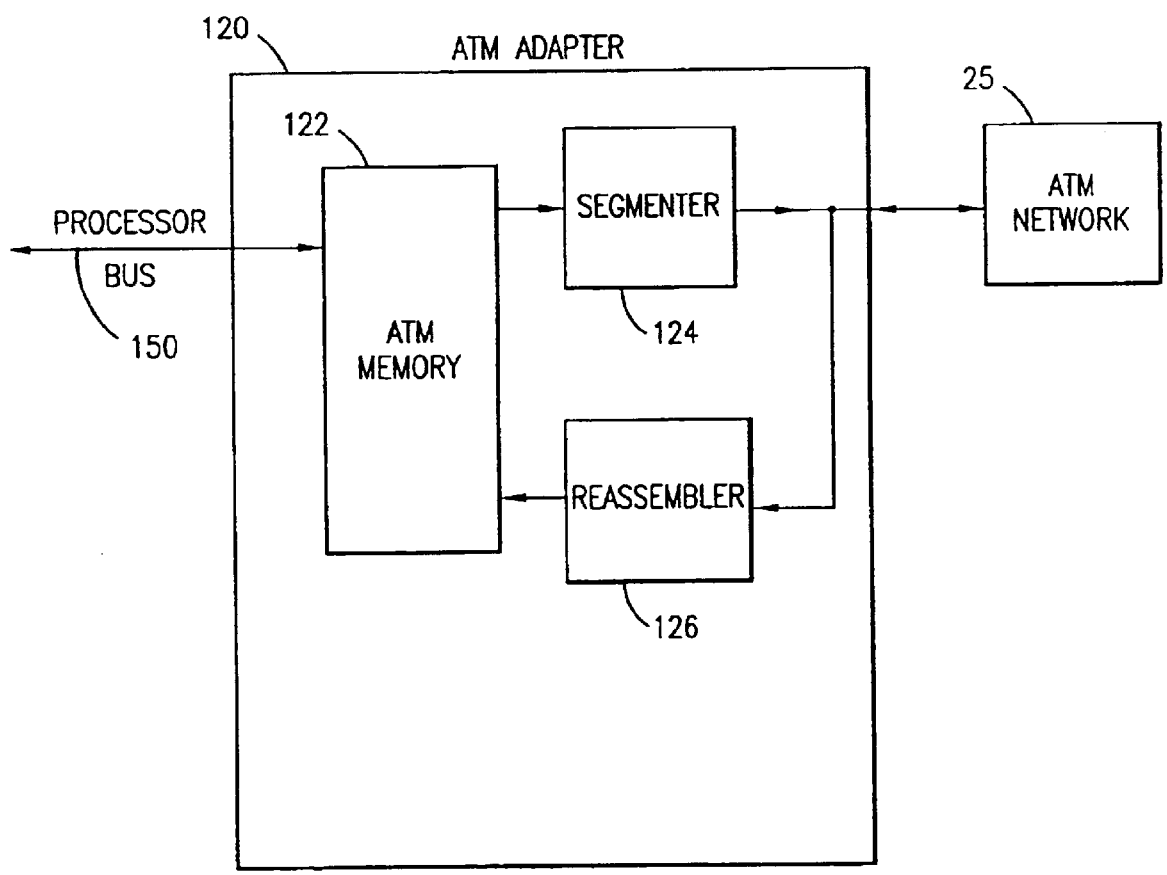
FIG. 10A is a block diagram of the ATM adapter for the segmenting/reassembling of ATM frames to and from ATM cells according to the preferred embodiment of this invention.

The ATM cells 290 are comprised of five bytes of cell header 292 and 48 bytes of data 294, as shown in FIG. 10B. For the present invention the cell header 292 is created by segmenter 124 from VCC information field 282 of ATM controller header 280. The 48 data bytes 294 are also created by segmenter 124, which reads frame 288 from ATM memory 122 and sequentially includes 48 bytes per cell into sequential ATM cells 290 until the entire frame 288 including ATM control header 280 is transmitted over the ATM network 25. Reassembler 126 receives ATM cells 290 from ATM network 25, discards cell header 292, and reassembles data bytes 294 back into frames 288 in ATM memory 122.

Note that ATM adapter 120 is prior art and described briefly herein to show the complete data flow from LANs 30 to ATM network 25. The importance of ATM adapter 120 to the present invention is that it accepts LAN frames in the ATM frame format 288 and converts frames 288 to ATM cells 290 and receives ATM cells 290 and converts them to frames 288.

Figure 8:
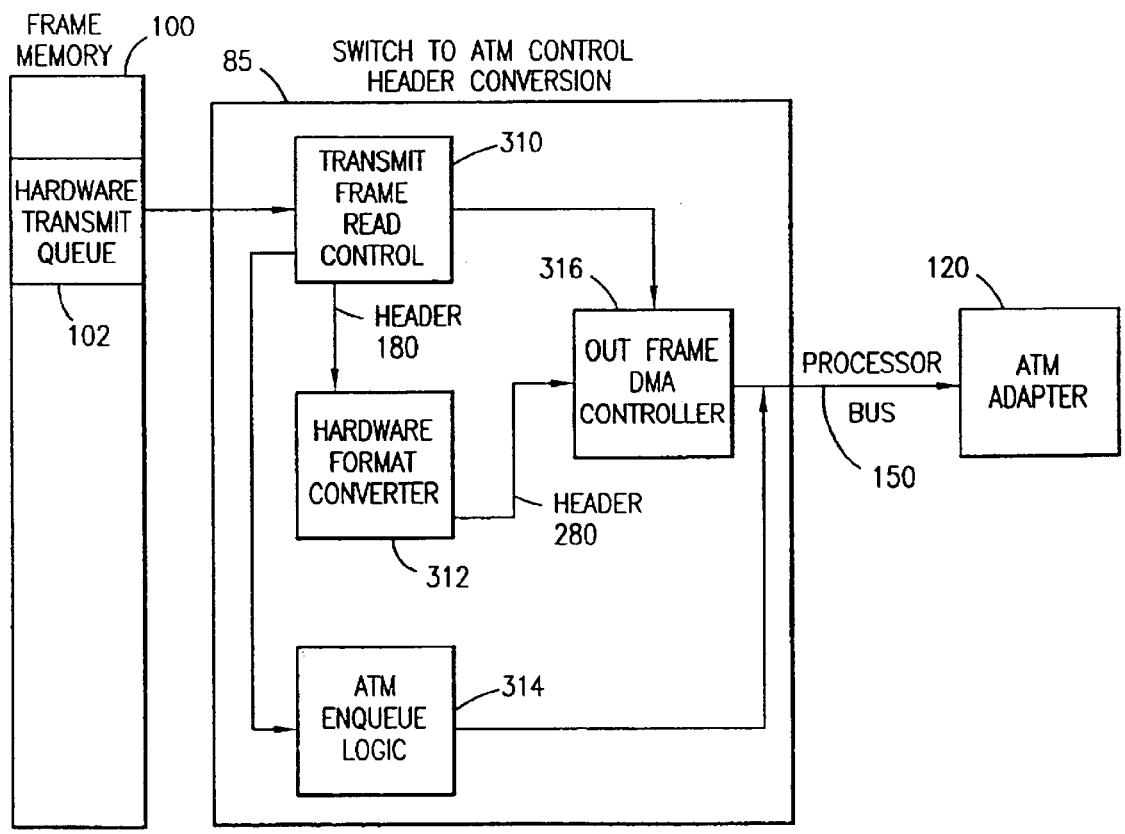
FIG. 8 is a block diagram showing the hardware format conversion of LAN frames to ATM frames according to the preferred embodiment of this invention.

Referring to FIG. 8, when a buffer is available in ATM memory 122 of ATM adapter 120 to receive the frame 288, OUT frame DMA controller 316 transfers the ATM control header 280 from hardware format converter 312 to the buffer in ATM memory 122 and then controls the DMA transfer of the LAN frame 287 from frame memory 100 to ATM memory 122 such that frame 288 is formed in ATM memory 122 comprising LAN frame 287 prefixed with ATM control header 280. After the entire frame 288 has been transferred to ATM memory 122, ATM adapter enqueue logic 314 signals ATM adapter 120 that it can now transmit frame 288 to ATM network 25, thus completing the transmit operation. The operation flow diagram of FIG. 5 shows these last two steps of the operation in blocks 226 and 228.

Receiving ATM to LAN Frames

For receiving frames 288 from ATM port 60 to LAN port 50, frame 288 first arrives from ATM network 25 into ATM port 60 and is reassembled by reassembler 126 of ATM adapter 120 of FIG. 10A.

Reassembler 126 removes the cell header 292 from ATM cells 290 and collects only the data bytes. Frame 288 is reassembled in a buffer in ATM memory 122.

Figure 11:
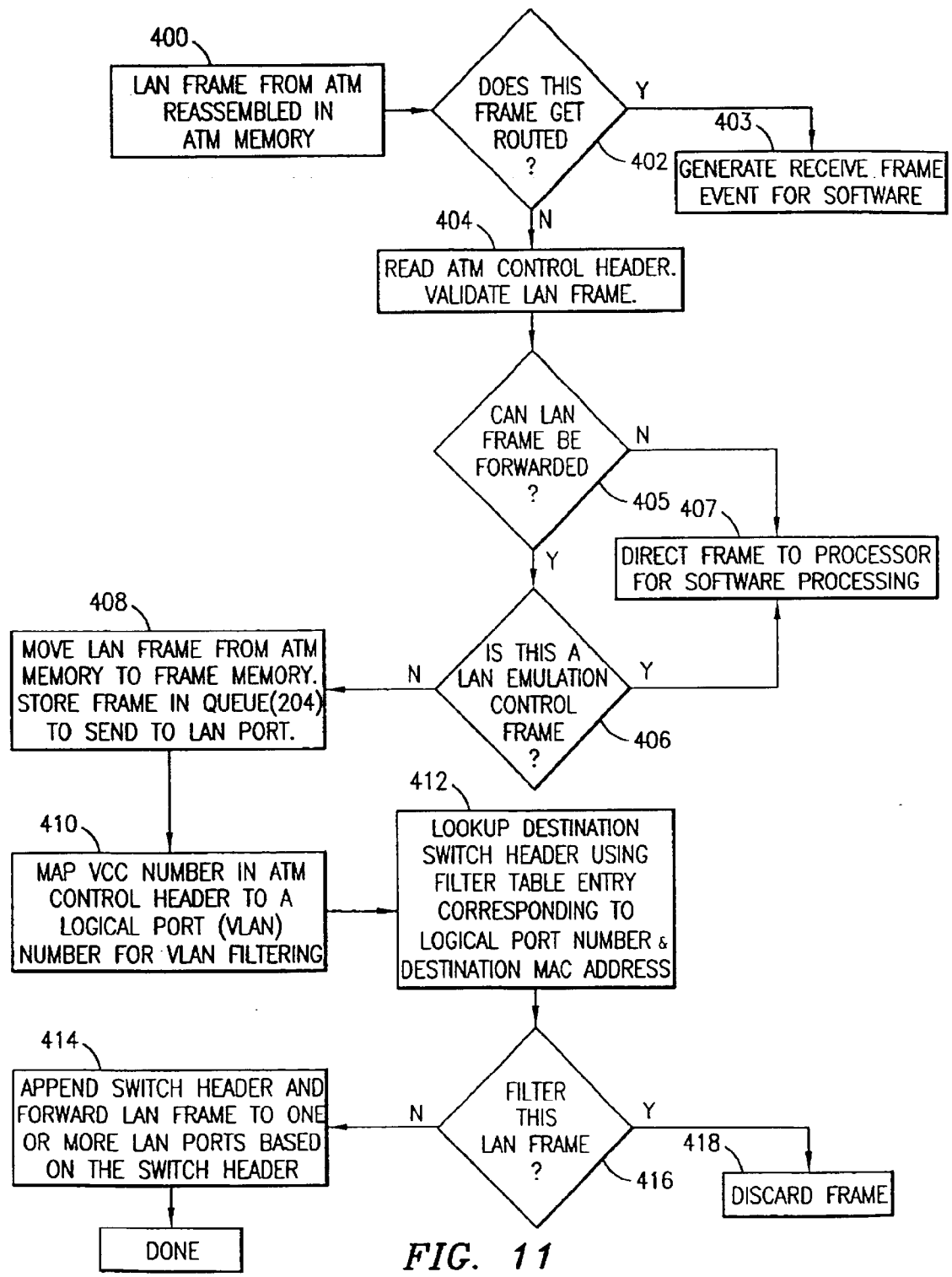
FIG. 11 is a flow chart of the operation for transmitting and converting an ATM frame from the ATM network to the LAN according to the preferred embodiment of this invention.
Figure 12:
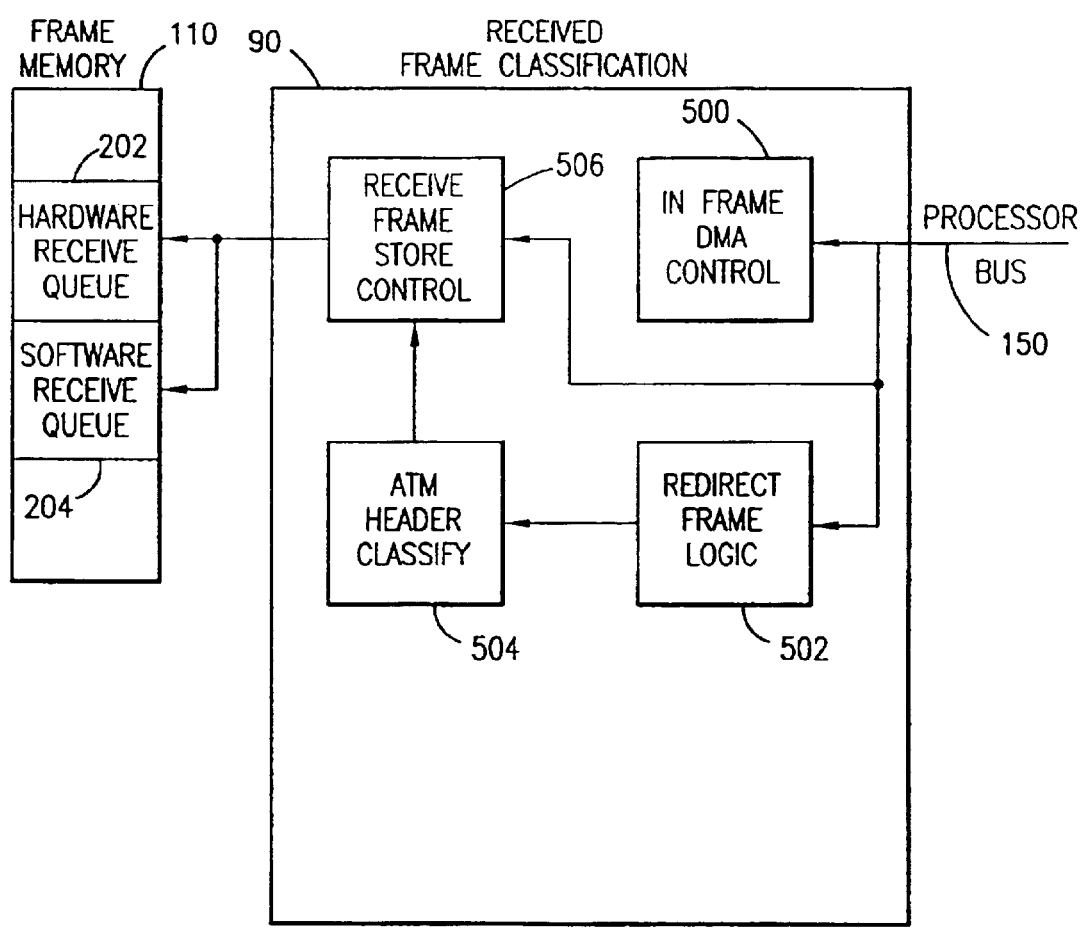
FIG. 12 is a block diagram showing the redirecting and classifying of incoming ATM frames into bridged frames and routed frames according to the preferred embodiment of this invention.

Referring to FIG. 11, a flow diagram is shown of the receive operation. Block 400 starts the receive operation by reassembling frame 288 in ATM memory 120. When the entire frame 288 has been reassembled, ATM control header 280 is read from the ATM memory 120 to the received frame classification block 90. Referring to FIG. 12, a detailed functional diagram is shown of block 90 of FIG. 4. ATM control header 280 is examined by redirect frame logic 502 and ATM header classify logic 504 to determine if it is a bridged frame, a routed frame, or a LAN emulation control frame. Redirect frame logic 502 determines if the incoming frame 288 is a LAN emulation control frame. The details are discussed hereinafter. ATM header classify logic 504 makes the routed frame verses bridged frame decision based upon several bits of the VCC number. Routed frames are transferred to software receive queue 204 of frame memory 100, as shown in blocks 402 and 403 of FIG. 11. Note that the routed frame path is not pertinent to the present invention and its flow is not followed in FIG. 11. Erroneous frames are forwarded by blocks 404, 405, 407 and LAN emulation control frames are forwarded by blocks 404, 405, 406, 407. Like routed frames, erroneous and LAN emulation control frames are sent for software processing and are not pertinent paths of the present invention. Recognizing and classifying the LAN emulation control frame is part of the present invention, which is discussed further hereinafter.

The path of interest starts at block 408 of FIG. 11, where the ATM frame 288 is bridged to LAN port 50. Referring to FIG. 12 for bridged frames, IN frame DMA control logic 500 controls the transfer of the entire frame 288 from ATM memory 120 to hardware receive queue 202 of frame memory 100. Receive frame store control logic 506 controls the storing of the received frame 288 to the tail of FIFO queue 202 to frame memory 100, and updates its pointers to point to the next tail value when the store is complete.

Figure 13:
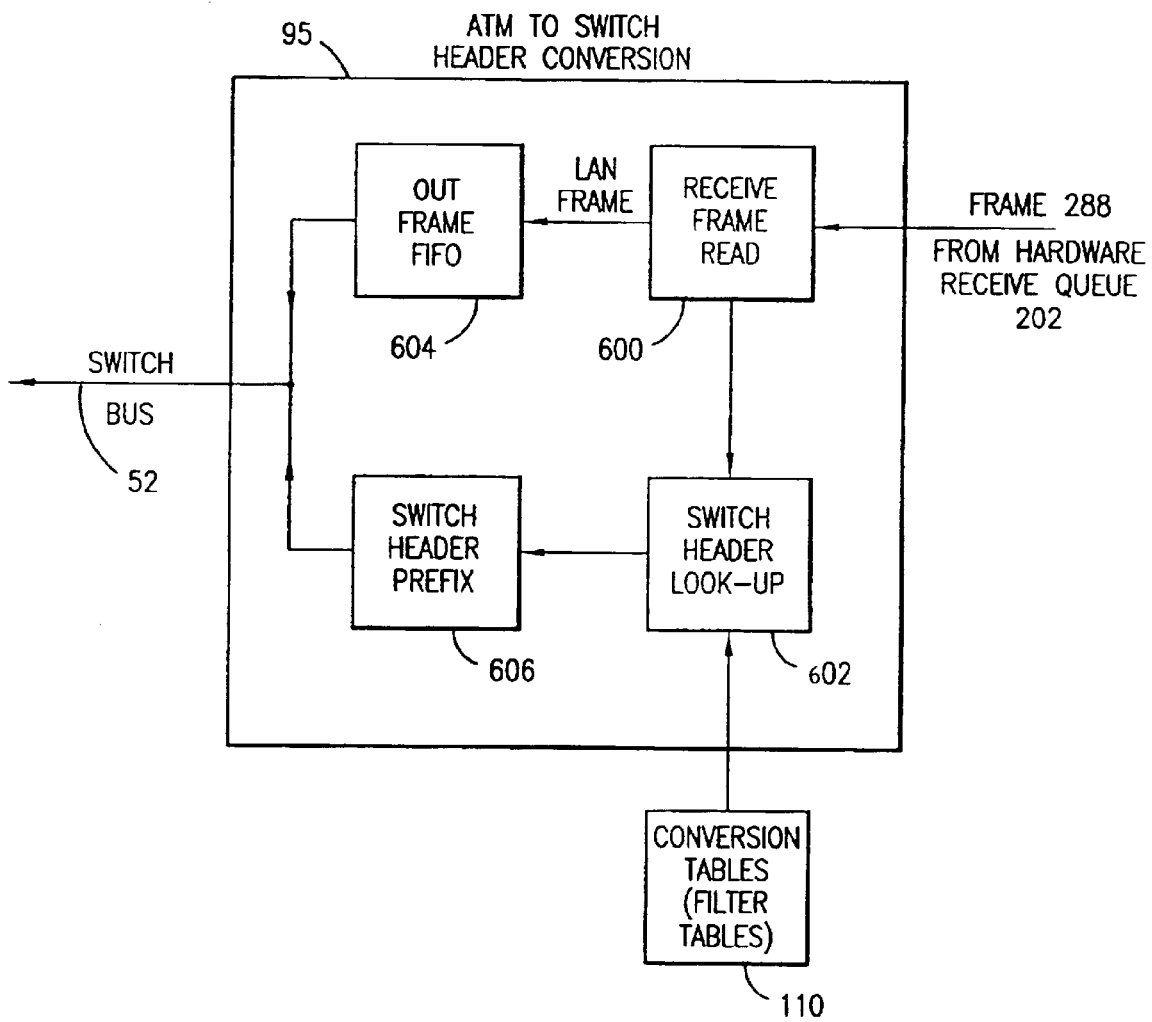
FIG. 13 is a block diagram showing the hardware format conversion of ATM frames to LAN frames according to the preferred embodiment of this invention.

Referring to FIG. 4, bridged frames are taken from the head of the FIFO queue 202 and processed by ATM-to-switch header conversion block 95. FIG. 13 is a block diagram showing further details of the ATM-to-switch header conversion block 95. Receive frame read control logic 600 reads the ATM control header 280 from the head of hardware receive queue 202 and sends the header 280 to switch header look-up logic 602. Logic 602 maps the VCC number 282 of ATM control header 280 to a logical port number, also referred to as the virtual LAN (VLAN) number for VLAN filtering as shown in block 410 of FIG. 11. This is done by using VCC 282 to address conversion tables 110 in frame memory 100.

Figure 14:
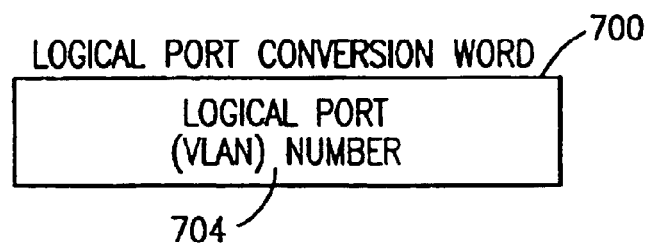
FIG. 14 is a diagram showing the composition of the logical port conversion word, which is stored in look-up tables in frame memory according to the preferred embodiment of this invention.

Referring to FIG. 14, the logical port conversion word 700 is read from conversion tables 110 as the first ATM-to-switch header conversion look-up. Word 700 is comprised of the logical port (VLAN) number 704. The VLAN number 704 and Destination MAC address of the LAN frame 287 are sent to the conversion tables 110 as the second ATM-to-switch header look-up to access the destination switch header 180, as shown by block 412 of FIG. 11. The second look-up table is called the filter table and the value accessed from the filter table determines if the LAN frame 287 can be forwarded or not, as shown by block 416 of FIG. 11. If the LAN frame 287 cannot be forwarded, the frame 288 is discarded as shown by block 418 of FIG. 11. This operation is called filtering. Referring to FIG. 6 (switch header format) if the frame 288 is not filtered, LAN frame 287 is converted from having ATM control header 280 to having switch header 180, and the converted frame is sent through switch 70 to LAN port 50 for transmission to LAN 30. The switch header 180 is generated from the filter table look-up by using the VLAN number 704 to index into that portion of the filter table containing entries for the Destination MAC addresses in that VLAN. The exit port in switch header 180 defines either a unicast or multicast destination for the forwarded LAN frame 287. The switch header 180 is stored to switch header prefix logic 606, while LAN frame 287 without ATM control header 280 is read from frame memory 100 under the control of receive frame read control logic 600 to OUT frame FIFO 604. The LAN frame is assembled by first reading the switch header 180 from switch header prefix logic 606 to switch bus 52. Next LAN frame 287 follows switch header 180 immediately and is sent from OUT frame FIFO 604 to switch bus 52 to switch 70, as shown by block 414 of FIG. 11.

Virtual LANs and LAN Emulation

LAN emulation involves the integration of existing Ethernet and Token Ring LANs with ATM networks. LAN emulation is required because the current generation of LAN applications are not provided directly by ATM networks. LANs provide data delivery to a single destination or multiple destinations based on a destination MAC address. On the other hand, ATM networks are not compatible directly with LANs because ATM networks deliver data on virtual channel connections (VCCs) that must be set-up in advance. LAN emulation provides the conversion layer that handles the complexities of ATM connection set-up, so that it is transparent to LAN applications. Thus, the ATM network functions virtually like a LAN for interconnecting LANs and is called a virtual LAN (VLAN).

Referring to FIG. 4 for performing fast conversions of MAC addresses to VCC addresses and vice versa, conversion tables 110 are loaded into frame memory 100 in advance. Tables 110 change with the application and are continually updated. The present invention provides a method for changing the values that control LAN emulation using LAN emulation header 286 of FIG. 9. The binary value which comprises the LAN emulation header 286, defines 8 LAN emulation control frames used to load values to ATM port 60 for controlling LAN emulation.

Figure 15:
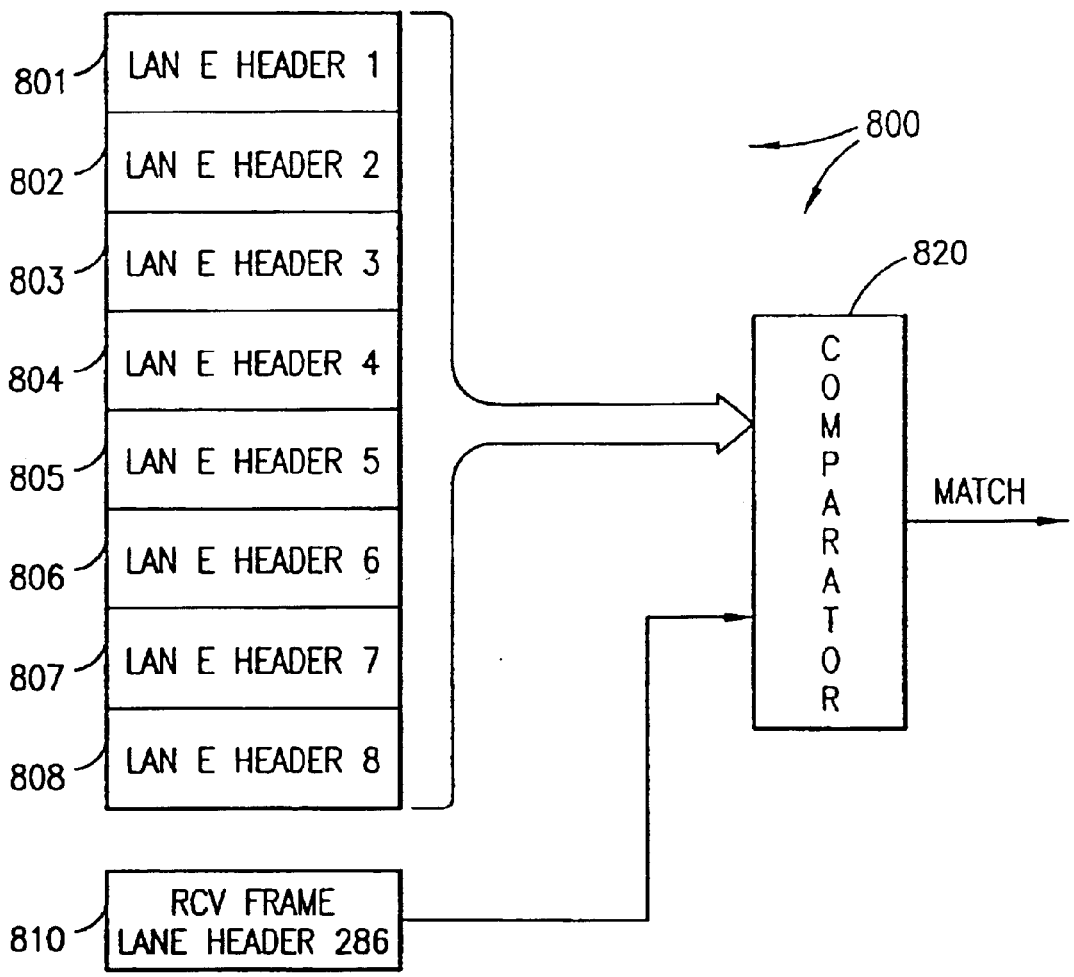
FIG. 15 is a block diagram showing the detection of LAN emulation control frames according to the preferred embodiment of this invention.

Referring to FIGS. 12 and 15, the LAN emulation (LAN E) hardware 800 internal to the redirect frame logic 502 implements eight 16-bit values stored in internal control registers 801 to 808. The LAN emulation header 286 for the received frame 288 is stored to register 810. Comparator 820 compares each register 801 to 808 to LAN emulation header 286 to determine if any of the registers 801 to 808 compare equally to LAN emulation header 286. If there is no compare, the incoming frame 288 is handled by ATM header classify logic 504 as either a routed or a bridged frame as described hereinabove. If there is a match from comparator 820, a LAN emulation control frame is detected which is forwarded to software receive queue 204 for further processing by the software. The software uses the information in the LAN emulation control frame to load the conversion tables, registers 801 and 808 and other miscellaneous LAN emulation control parameters. Note that registers 801 to 808 are loaded under software control and are not hardware forced to constant values.

It is an advantage of this invention to provide a high performance bridging path between dissimilar networks by implementing the bridging path as a hardware forwarding engine for transmitting LAN frames between LAN ports and ATM ports of the LAN switch.

It is a further advantage of this invention to sort incoming LAN messages at each port of the LAN switch into two different paths for efficient routing or bridging between dissimilar networks.

It is a further advantage of this invention to provide LAN emulation over ATM networks which permits LAN frames to be transmitted between two different LAN segments interconnected by an ATM network.

It is a further advantage of this invention to provide two different types of memory queues, one being a software queue of frames to be processed by a microprocessor and the other being a hardware queue of frames to be processed by a hardware forwarding engine.

It will be appreciated that, although a specific embodiment of the invention has been described herein for purposes of illustration, various modifications may be made without departing from the spirit and scope of the invention.

Accordingly, the scope of protection of this invention is limited only by the following claims and their equivalents.

What is claimed is:

1. A LAN emulation system comprising:
a plurality a local area networks (LANs);
an ATM network;
plurality of LAN switches for interconnecting LANS and ATM networks;
a controlling processor; and
a LAN emulation means, wherein communications in the form of frames are transmitted from a first LAN to the LAN switch to the ATM network to another or second LAN switch to a second LAN;
wherein the LAN emulation means further comprises LAN emulation control hardware for presetting LAN switch controls in advance of the frame transmission for controlling the ATM network to function like a LAN when transporting frames from LANs to ATM or ATM to LANs;
wherein the LAN emulation means further comprises a LAN emulation header means for identifying frames having information for presetting the LAN emulation control hardware;
wherein the LAN emulation control hardware further comprises a plurality of registers for storing LAN emulation headers, wherein each register contains a unique LAN emulation header data pattern.

2. The LAN emulation system of claim 1 wherein the plurality of registers specify the set of LAN emulation headers that contain information for presetting the LAN emulation control hardware.

3. The LAN emulation system for claim 1 wherein the LAN emulation means further comprises a LAN emulation control sorting means for checking each LAN emulation header arriving from the ATM network to determine if the LAN emulation header matches any of the prestored plurality of LAN emulation headers in the registers and contains information for presetting the LAN emulation control hardware.

4. The LAN emulation system of claim 3 wherein the LAN emulation means further comprises a forwarding means, wherein frames arriving from the ATM network containing information for presetting the LAN emulation control hardware are sent to the controlling processor to be processed.

* * * * *